United States Patent
Ohtsuki

(10) Patent No.: US 8,186,888 B2
(45) Date of Patent: May 29, 2012

(54) WHEEL BEARING AND A BEARING APPARATUS FOR A WHEEL OF VEHICLE OF SEMI-FLOATING TYPE HAVING THE WHEEL BEARING

(75) Inventor: Hisashi Ohtsuki, Iwata (JP)

(73) Assignee: NTN Corporation (JP)

( * ) Notice: Subject to any disclaimer, the term of this patent is extended or adjusted under 35 U.S.C. 154(b) by 999 days.

(21) Appl. No.: 10/582,309

(22) PCT Filed: Dec. 2, 2004

(86) PCT No.: PCT/JP2004/017917
§ 371 (c)(1),
(2), (4) Date: Jun. 9, 2006

(87) PCT Pub. No.: WO2005/056309
PCT Pub. Date: Jun. 23, 2005

(65) Prior Publication Data
US 2007/0122071 A1    May 31, 2007

(30) Foreign Application Priority Data

Dec. 10, 2003  (JP) .................................. 2003-411307
Sep. 21, 2004  (JP) .................................. 2004-273178

(51) Int. Cl.
*F16C 19/38* (2006.01)
*F16C 33/60* (2006.01)
*B60B 35/18* (2006.01)
(52) U.S. Cl. ..................................... 384/544; 301/105.1
(58) Field of Classification Search ................... 384/544, 384/589; 301/105.1, 137
See application file for complete search history.

(56) References Cited

U.S. PATENT DOCUMENTS

| 4,405,032 | A | | 9/1983 | Welschof et al. |
| 5,603,554 | A | | 2/1997 | Monroe et al. |
| 5,975,767 | A | * | 11/1999 | Mizukoshi et al. ........... 384/544 |
| 6,296,321 | B1 | * | 10/2001 | Mizukoshi et al. ........ 301/105.1 |
| 7,255,482 | B2 | * | 8/2007 | Yamamoto .................... 384/544 |
| 2001/0019639 | A1 | | 9/2001 | Toda et al. |
| 2002/0025093 | A1 | | 2/2002 | Sahashi et al. |

FOREIGN PATENT DOCUMENTS

| JP | 57-194805 | * | 12/1982 |
| JP | 2001-099172 A | | 4/2001 |
| JP | 2001-233009 | | 8/2001 |
| JP | 2001-246903 A | | 9/2001 |
| JP | 2001-354004 A | | 12/2001 |
| JP | 2002-021865 A | | 1/2002 |
| JP | 2002-187406 | | 7/2002 |
| JP | 2002-283804 | | 10/2002 |

* cited by examiner

Primary Examiner — William C Joyce
(74) Attorney, Agent, or Firm — Harness, Dickey & Pierce, P.L.C.

(57) ABSTRACT

A semi-floating vehicle wheel bearing apparatus is structured as a unit with a wheel hub (1,14) and a double row rolling bearing (2, 15). The wheel hub inner circumferential surface includes a serration (8). One or more inner rings (10) are press-fit onto a cylindrical portion (7) of the wheel hub (1, 14). An outer member (4) is arranged around the inner member (3, 16). The outer member (4) is formed with double row outer raceway surfaces (4a) on its inner circumferential surface opposite to inner raceway surfaces (10a). Double row rolling elements (5) are arranged between the inner and outer raceway surfaces (10a, 4a). A partition wall (9) is integrally formed on the wheel hub (1, 14), at its outboard side, to close a central bore of the wheel hub (1, 14).

7 Claims, 4 Drawing Sheets

WHEEL BEARING AND A BEARING APPARATUS FOR A WHEEL OF VEHICLE OF SEMI-FLOATING TYPE HAVING THE WHEEL BEARING

CROSS-REFERENCE TO RELATED APPLICATIONS

This application is a National Stage of International Application No. PCT/JP2004/017917, filed Dec. 2, 2004, which claims priority to Japanese Patent Application No. 2003-411307, filed Dec. 10, 2003 and Japanese Patent Application No. 2004-273178, filed Sep. 21, 2004. The disclosures of the above applications are incorporated herein by reference

FIELD

The present disclosure relates to a vehicle wheel bearing apparatus to rotatably support the wheel relative to a suspension apparatus of the vehicle and, more particularly, to a wheel bearing where a driving wheel is supported by a double row rolling bearing and a vehicle bearing apparatus of a semi-floating type having the wheel bearing.

BACKGROUND

In a vehicle such as a truck, which has a body of a frame construction, an axle structure of a driving wheel of a full-floating type has been widely adopted. In recent driving wheel supporting structure, a unit structure of a double row rolling bearing has been widely adopted so as to improve the readiness of assembly, reduction of weight and size. One example of such a prior art vehicle wheel bearing apparatus is shown in FIG. 4.

In this vehicle wheel bearing apparatus, a drive shaft 52, connected to a differential apparatus (not shown), is inserted into an axle housing 51. A double row conical roller bearing 53 is mounted on the axle housing 51. A wheel hub 54, rotatably supported by the double row conical roller bearing 53, is connected to a flange 56, via hub bolts 55. A pair of inner rings 57 is connected to each other by a connecting ring 58. The rings 57 are fit onto the end of the axle housing 51 and then securely fastened by a fastening nut 59. On the other hand, an outer ring 60, of the double row conical roller bearing, is fit into the wheel hub 54. The outer ring 60 is axially secured with both its ends being sandwiched by the flange 56 of the drive shaft 52 and a brake rotor 61. Double row conical rollers 62 are rollably contained by cages 63 between the annular space between the inner and outer rings 57 and 60. Seals 64 are arranged at both ends of the annular space to seal off the inside of the wheel bearing from the outside.

The inboard side end of the inner ring 57 is formed with an annular stepped portion 65. A seal ring 66 is mounted on the stepped portion 65. An annular recess 67 is formed on the outer circumferential surfaces at mutually abutting portions of the pair of inner rings 57. A seal ring 68, of an elastic material, is fitted into the recess 67. The seal rings 66 and 68 prevent penetration or ingress of rain water or dusts into the axle housing 51, leakage of differential gear oil to outside and ingress of the differential gear oil into the inside of the bearing (see Japanese Laid-open Patent publication No. 99172/2001).

However, since the prior art vehicle wheel bearing apparatus has a structure so that the double row conical roller bearing 53 is arranged between the wheel hub 54 and the axle housing 51, the drive shaft 52 is inserted into the axle housing 51, the flange 56 of the drive shaft 52 is connected to the wheel hub 54 by the hub bolts 55, a reduction of the weight and size of the bearing apparatus is limited. Also, assembly of the bearing apparatus is complicated due to a large number of structural parts.

SUMMARY

It is therefore an object of the present disclosure to provide a vehicle wheel bearing apparatus which can reduce the weight, size and number of parts. Also, the bearing apparatus prevents ingress of rain water or dusts and leakage of differential gear oil.

The present disclosure provides a vehicle wheel bearing apparatus structured as a unit of a wheel hub and a double row rolling bearing which comprises an inner member with a wheel hub integrally formed with a wheel mounting flange on one end. A serration is formed on its inner circumferential surface of the wheel hub. An axially extending cylindrical portion is formed with the flange. One or more inner rings are press-fit onto the cylindrical portion of the wheel hub. At least one of inner raceway surfaces is formed on an outer circumferential surface of the inner rings. An outer member is arranged around the inner member. The outer member includes double row outer raceway surfaces on its inner circumferential surface opposite to the inner raceway surfaces. Double row rolling elements are arranged between the inner and outer raceway surfaces of the inner member and the outer member. A cage freely rollably holds the rolling elements. Seals seal an annular space between the inner member and the outer member. A partition wall is integrally formed on the wheel hub at its outboard side to close a central bore of the wheel hub.

Since the partition wall is integrally formed on the wheel hub at its outboard side to close a central bore of the wheel hub, the rigidity of the wheel hub is increased. Thus, it is possible to suppress the elastic deformation of the wheel hub and to improve the durability of the bearing apparatus.

Since one of the inner raceway surfaces is formed directly on the outer circumferential surface of the wheel hub, it is possible to further reduce the size and weight and increase the rigidity of the bearing.

Since the end of the cylindrical portion is plastically deformed radially outward to form a caulked portion to prevent the inner ring from slipping off of the cylindrical portion of the wheel hub, it is unnecessary to control the amount of preload of the bearing as in the prior art by tightly fastening the inner ring using a nut. Thus, ease of assembly of the bearing apparatus to a vehicle can be improved. Also, the predetermined amount of preload can be kept for a long term. In addition, it is possible to substantially reduce the number of parts and to reduce manufacturing cost, weight and size of the bearing due to the improvement in the ease of assembly.

Since the outer circumferential region of the wheel mounting flange, from its inboard side base to the cylindrical portion, is hardened by high frequency induction hardening to have a surface hardness of 58~64 HRC, and since the caulked portion remains unhardened to have a surface hardness of 25 HRC or less after forging, it is possible to improve the durability of the wheel hub and the workability of the caulked portion during its plastic deformation. Thus, this improves the reliability and quality of the bearing.

Since the vehicle wheel bearing apparatus of the semi-floating type comprises an axle housing supported under a body of a vehicle; a hollow drive shaft inserted into the axle housing; the vehicle wheel bearing apparatus arranged between the drive shaft and an opening of the axle housing; the drive shaft connected to the inner member so that torque is transmittable between the two, it is possible to provide a vehicle wheel bearing apparatus of the semi-floating type which has a high rigidity and can reduce the weight and size of the gearing apparatus. Also, this can prevent leakage of differential gear oil to the outside as well as the ingress of rain water or dusts from the outside into the differential gear oil through the driving shaft.

Since the drive shaft is separably connected to the inner member via the serration, the workability of assembly of the bearing apparatus can be remarkably improved.

According to the present vehicle wheel bearing apparatus, since the vehicle wheel bearing apparatus is structured as a unit of a wheel hub and a double row rolling bearing comprising an inner member with a wheel hub integrally formed with a wheel mounting flange on one end and with its inner circumferential surface including a serration and having an axially extending cylindrical portion with one or more inner rings press-fit onto the cylindrical portion of the wheel hub and with the inner rings formed with at least one of inner raceway surfaces on its outer circumferential surface; an outer member arranged around the inner member and formed with double row outer raceway surfaces on its inner circumferential surface opposite to the inner raceway surfaces; double row rolling elements arranged between the inner and outer raceway surfaces of the inner member and the outer member; a cage freely rollably holding the rolling elements; seals for sealing an annular space between the inner member and the outer member; and a partition wall integrally formed on the wheel hub at its outboard side to close off a central bore of the wheel hub, the rigidity of the wheel hub is increased and thus it is possible to suppress the elastic deformation of the wheel hub and to improve the durability of the bearing apparatus.

In addition, according to the present vehicle wheel bearing apparatus, since a vehicle wheel bearing apparatus is of a semi-floating type comprising an axle housing supported under a body of vehicle; a hollow driving shaft inserted into the axle housing; the vehicle wheel bearing apparatus is arranged between the drive shaft and an opening of the axle housing; the drive shaft connected to the inner member so that torque is transmittable between the two, it is possible to provide a vehicle wheel bearing apparatus of the semi-floating type which has a high rigidity and can reduce weight and size. Also, it prevents leakage of differential gear oil to the outside as well as the ingress of rain water or dusts from the outside into the differential gear oil through the drive shaft.

A vehicle wheel bearing apparatus is structured as a unit of a wheel hub and a double row rolling bearing which comprises an inner member with a wheel hub integrally formed with a wheel mounting flange on one end. A serration is formed on its inner circumferential surface of the wheel hub. Also, an axially extending cylindrical portion is formed with the flange. One or more inner rings are press-fit onto the cylindrical portion of the wheel hub. At least one inner raceway surface is formed on an outer circumferential surface of the inner rings. An outer member is arranged around the inner member and formed with double row outer raceway surfaces on its inner circumferential surface opposite to the inner raceway surfaces. Double row rolling elements are arranged between the inner and outer raceway surfaces of the inner member and the outer member. A cage freely rollably holds the rolling elements. Seals seal an annular space between the inner member and the outer member. A partition wall is integrally formed on the wheel hub at its outboard side to close a central bore of the wheel hub.

BRIEF DESCRIPTION OF THE DRAWINGS

Additional advantages and features of the present disclosure will become apparent from the subsequent description and the appended claims, taken in conjunction with the accompanying drawings, wherein:

DESCRIPTION OF THE PREFERRED EMBODIMENTS

Preferred embodiments of the present disclosure will be described with reference to accompanied drawings.

Figure 1:
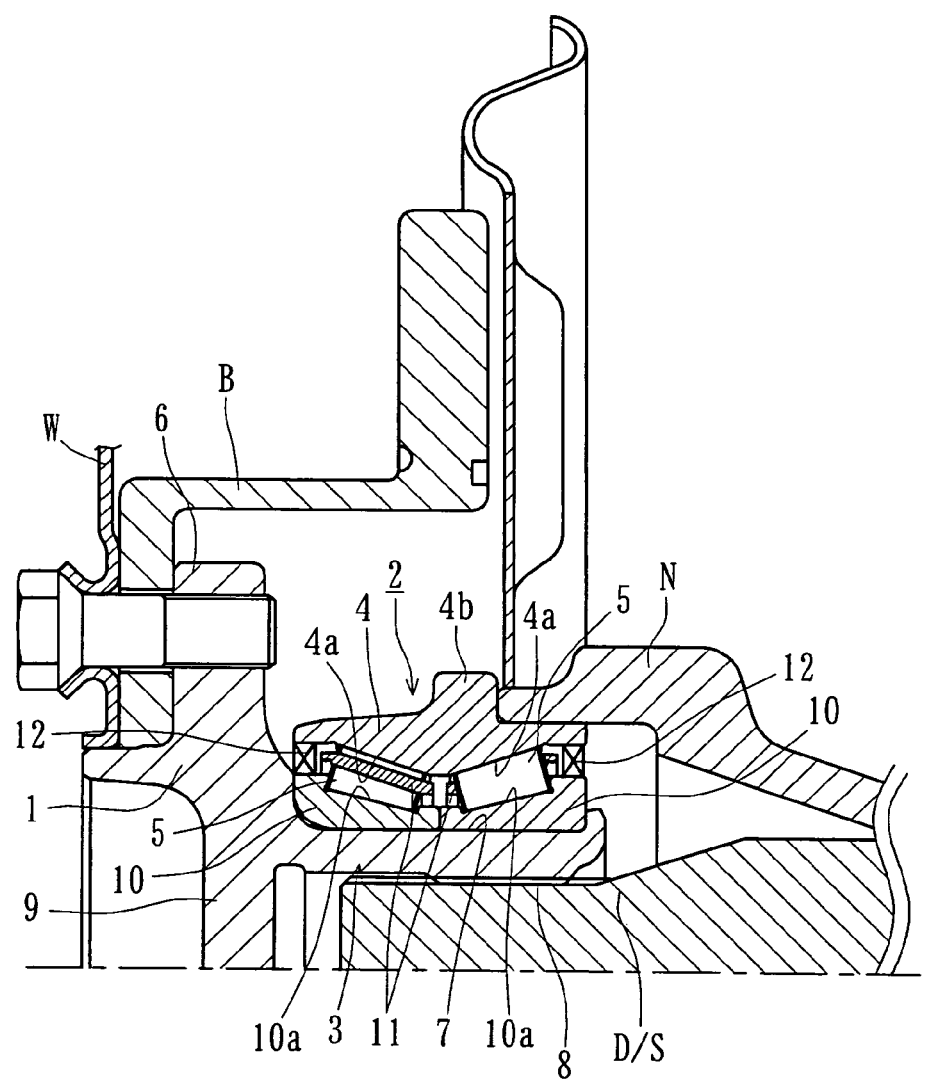
FIG. 1 is a longitudinal-section view of a first embodiment of a vehicle wheel bearing apparatus.
Figure 2:
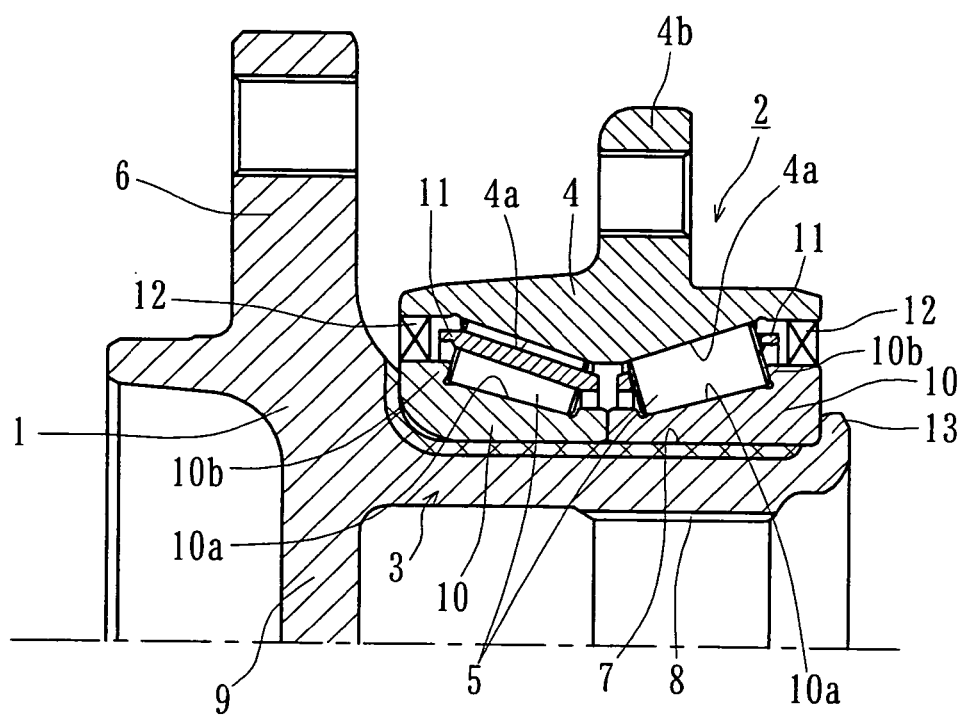
FIG. 2 is a partially enlarged longitudinal-section view of FIG. 1 showing a wheel bearing.

FIG. 1 is a longitudinal-section view of a first embodiment of a bearing apparatus for a wheel of the present disclosure. FIG. 2 is a partially enlarged longitudinal-section view of FIG. 1. In the description of the present disclosure, a side of a bearing positioned outward of the vehicle, when it is mounted on the vehicle, is referred to as the "outboard" side (the left side in a drawing). A side inward of the vehicle is referred to as the "inboard" side (the right side in a drawing).

In a vehicle wheel bearing apparatus of the present disclosure, a wheel hub 1 and a double row rolling bearing 2 are formed as a unit and connected to a drive shaft "D/S". The double row rolling bearing 2 includes an inner member 3, an outer member 4, and double row rolling elements (tapered rollers) 5 freely rollably contained between the inner and outer members 3 and 4. The inner member 3 includes the wheel hub 1 and a pair of inner rings 10 press-fit onto the wheel hub 1. The wheel hub 1 is integrally formed, at its outboard side, with a wheel mounting flange 6. A wheel "W" and a brake rotor "B" are mounted onto the wheel mounting flange 6. An axially extending cylindrical portion 7 extends from the wheel mounting flange 6. An inner circumferential surface (bore) of the wheel hub 1 is integrally formed with a serration (or spline) 8. A serrated portion of the drive shaft "D/S" is inserted into the bore so that torque can be transmitted between the two. A partition wall 9, on the outboard side of the wheel hub 1, closes a central bore (inner circumferential surface) of the wheel hub 1.

As shown in FIG. 2, the double row rolling bearing 2 includes an outer member 4 formed with double row outer raceway surfaces 4a on its inner circumferential surface. A body mounting flange 4b, formed on an outer circumferential surface of the outer member, is to be secured on an axle housing "H". A pair of inner rings 10 is inserted in the outer member 4. The inner rings 10 are formed with double row tapered inner raceway surfaces 10a on their outer circumferential surface opposite to the outer raceway surfaces 4a. Double row rolling elements 5 are arranged between the inner and outer raceway surfaces 10a, 4a. A cage 11 freely rollably holds the rolling elements 5. Each of the inner rings 10 is formed with, at its larger diameter end, a large flange 10b to guide the rolling elements 5. The pair of inner rings 10 is arranged so that their inner ends abut each other and form a so-called back-abutted type double row tapered roller bearing. Seals 12 are arranged at ends of the outer member 4 to seal an annular space between the outer member 4 and the inner rings 10. The seals 12 prevent both penetration of rain water or dusts from the external circumstances and leakage of lubricating grease sealed within the bearing. The inboard side seal 12 further prevents penetration or ingress of differential gear oil into the inside of the bearing passing through the serration 8 of the wheel hub 1.

The pair of inner rings 10 is press-fit onto the cylindrical portion 7 of the wheel hub 1. The inner rings 10 are prevented from axially slipping off the cylindrical portion 7 by a caulked portion 13. The caulked portion 13 is formed by plastically deforming the end of the cylindrical portion 7 radially outward. Since this embodiment adopts a self-retaining structure of the second generation, it is not required to control an amount of preload as in a conventional manner by tightly fastening a nut against the inner ring. Accordingly, it is possible to substantially reduce the number of parts and thus to improve the readiness of assembly as well as to reduce its manufacturing cost, size and weight.

The wheel hub 1 is made of medium carbon steel such as S53C which includes carbon of about 0.40~0.80% by weight. The wheel hub 1 is hardened by high frequency induction quenching so that the inboard base side of the wheel mounting flange 6 and the cylindrical portion 7 of the wheel hub 1 have a surface hardness of 58~64 HRC (the hardened portion is shown in the drawings by cross-hatched lines). The caulked portion 13 remains as an unhardened portion with its surface hardness of 25 HRC or less. This improves the durability and workability of the caulked portion 13 and also prevents the generation of cracks.

The outer member 4 is also made of medium carbon steel such as S53C which includes carbon of about 0.40~0.80% by weight. The double row outer raceway surfaces 4a and the inner circumferential surface of the outer member 4 where the seal 12 is mounted are hardened by high frequency induction quenching so that their surface hardness is within 58~64 HRC. On the other hand, the inner rings 10 are made of high carbon chrome bearing steel such as SUJ2. The inner rings 10 are hardened to their core by dip quenching to have a surface hardness of HRC 58~64. Although, the bearing is illustrated as a double row tapered roller bearing using tapered roller as the rolling elements 5, a double row angular ball bearing, using balls, may be also used.

In this embodiment, since the partition wall 9 is integrally formed at the outboard side on the wheel hub 1 to close the central bore (inner circumferential surface) of the wheel hub 1, high rigidity of the wheel hub 1 can be maintained high even though it is used in the bearing apparatus of the semi-floating type. Thus, it is possible to suppress an elastic deformation of the wheel hub 1 even though a moment load is applied to the wheel hub 1 during running of the vehicle. It also prevents ingress of rain water or dusts from the ambient circumstances into the drive shaft "D/S" and thus into the differential gear oil.

Figure 3:
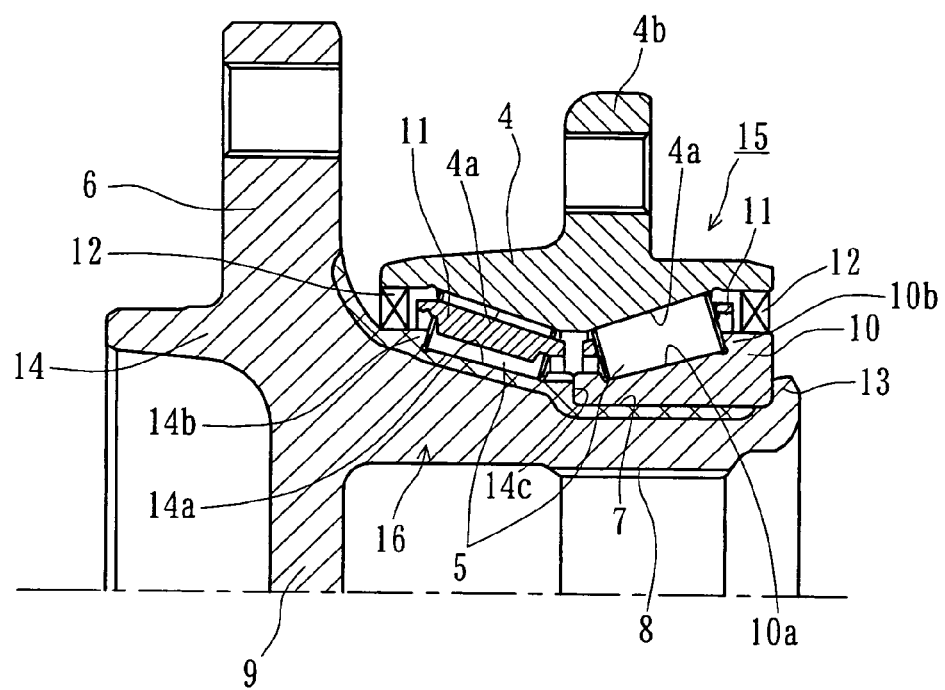
FIG. 3 is a longitudinal-section view of a second embodiment of the vehicle wheel bearing apparatus.
Figure 4:
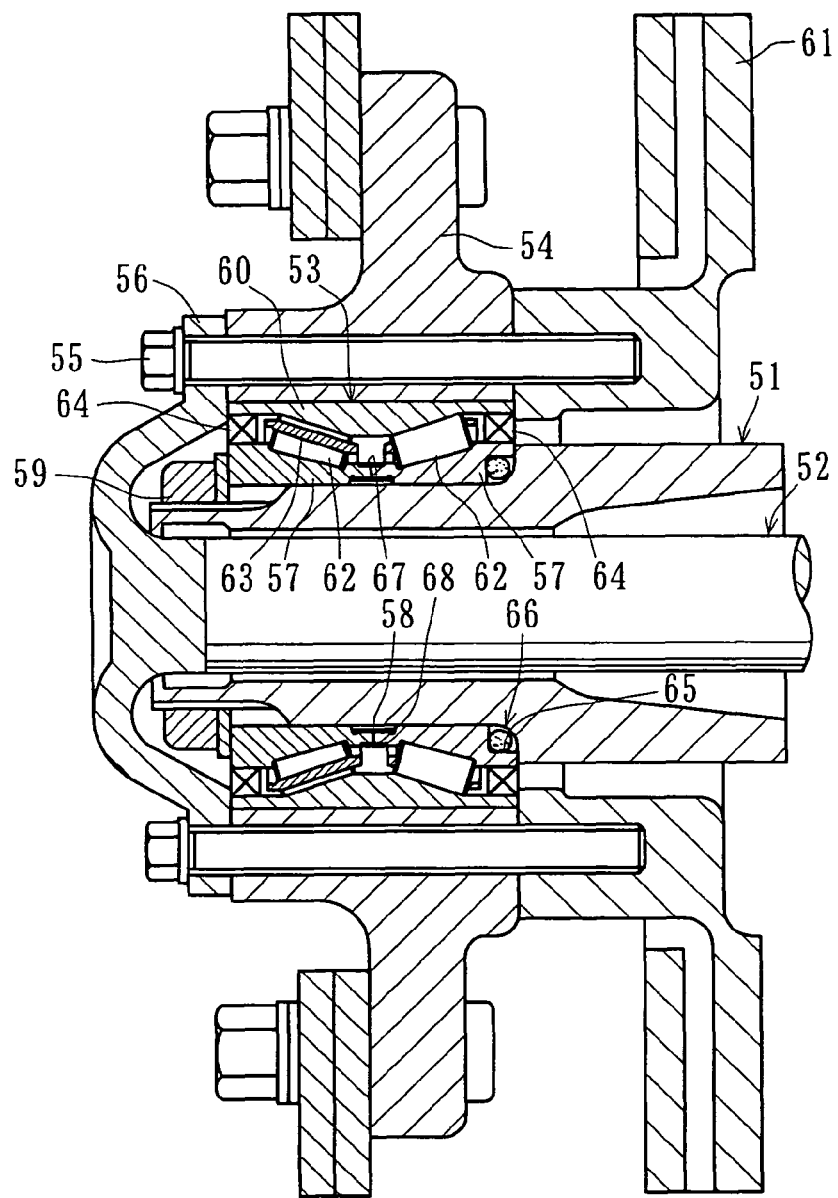
FIG. 4 is a longitudinal-section view of a prior art vehicle wheel bearing apparatus.

FIG. 3 is a longitudinal-section view of a second embodiment of the vehicle wheel bearing apparatus of the present disclosure. Since difference of this embodiment from the first embodiment only resides in the structure of the wheel hub, the same numerals are used as those used in the first embodiment to designate the same structural elements.

The vehicle wheel bearing apparatus is structured as a unit of a wheel hub 14 and a double row rolling bearing 15. The double row rolling bearing 15 includes an inner member 16, an outer member 4, and double row rolling elements 5 and 5 freely rollably contained between the inner and outer members 16 and 4. The inner member 16 includes the wheel hub 14. An inner ring 10 is press-fit onto the wheel hub 14. The wheel hub 14 is integrally formed, at its outboard side, with a wheel mounting flange 6. A wheel (not shown in FIG. 3) is mounted on the flange 6. An inner raceway surface 14a is formed on the wheel hub 14 at the outboard side of the bearing 15. The cylindrical portion 7 axially extends from the inner raceway surface 14a. The wheel hub 14 is formed with a serration (or spline) 8 on its inner circumferential surface (bore). A serrated portion of the drive shaft (not shown in FIG. 3) is inserted into the bore to transmit torque between the two. A partition wall 9, on the outboard side of the wheel hub 14, closes a central bore (inner circumferential surface) of the wheel hub 14.

The outer circumferential surface of the wheel hub 14 is formed with a flange portion 14b corresponding to the large flange 10b of the inner ring 10. A stepped portion 14c is in the outer circumferential face to abut an inner end face (smaller end face) of the inner ring 10. Thus, this provides a so-called back-abutted type double row tapered roller bearing structure. In addition, the inner ring 10 is press-fit onto the cylindrical portion 7 of the wheel hub 14. The inner ring 10 is prevented from axially slipping off the cylindrical portion 7 by a caulked portion 13. The caulked portion 13 is formed by plastically deforming the end of the cylindrical portion 7 radially outward. Since this embodiment adopts a self-retaining structure of a third generation, it is not required to control an amount of preload as in a manner similar to the first embodiment by tightly fastening a nut against the inner ring. Accordingly, it is possible to improve the readiness of assembly as well as to maintain the amount of preload for a long term.

Since the inner raceway surface 14a is directly formed on the outer circumferential surface of the wheel hub 14 and the partition wall 9 is also integrally formed on the wheel hub 14 at its outboard side, the rigidity of the wheel hub 14 is increased. Accordingly, it is possible to suppress an elastic deformation of the wheel hub 14 even though the moment load is applied to the wheel hub 14 during running of the vehicle. Also, it prevents ingress of rain water or dusts from the ambient circumstances into the drive shaft "D/S" and thus into the differential gear oil.

The present vehicle wheel bearing apparatus can be applied to a bearing apparatus for a wheel of a vehicle of the driving wheel side of the semi-floating type where a wheel bearing is arranged in opened portions between a drive shaft and an axle housing.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The invention claimed is:

1. A semi-floating vehicle wheel bearing apparatus coupled with an axle housing structured as a unit of a wheel hub and a double row rolling bearing comprising:

an inner member including a wheel hub integrally formed with a wheel mounting flange on one end, a central bore with an inboard side end and an outboard side end formed in the wheel hub, an inner circumferential surface of the central bore of the wheel hub is formed with a serration for engaging a drive shaft that passes into the inboard side end of the central bore, an axially extending cylindrical portion with a pair of inner raceway surfaces extend from the flange;

one or more inner rings being press-fit onto the cylindrical portion of the wheel hub, the one or more inner rings are formed with at least one of the inner raceway surfaces on its outer circumferential surface;

an outer member is arranged around the inner member, the outer member is formed with double row outer raceway surfaces on its inner circumferential surface opposite to the inner raceway surfaces;

double row rolling elements are arranged between the inner and outer raceway surfaces of the inner member and the outer member;

a cage freely rollably holds the rolling elements;

seals seal an annular space between the inner member and the outer member;

a differential axle housing connected to the outer member and extending along the drive shaft; and a partition wall is integrally formed on the wheel hub at its outboard side to close the outboard side end of the central bore of the wheel hub, the partition wall is positioned radially inward in a plane containing the wheel mounting flange such that an outward face of the partition wall is positioned radially inward and axially inward of an outward face of the wheel mounting flange, the partition wall increases the rigidity of the wheel hub to suppress an elastic deformation of the wheel hub even though the moment load is applied to the wheel hub during running of the vehicle, and the partition wall prevents ingress of rain water or dust from an end portion of the drive shaft and thus into the differential gear oil.

2. The vehicle wheel bearing apparatus of claim 1 wherein at least one of said inner raceway surfaces is formed directly on the outer circumferential surface of the wheel hub.

3. The vehicle wheel bearing apparatus of claim 1 wherein the end of said cylindrical portion is plastically deformed radially outward to form a caulked portion for preventing the inner ring from slipping off of the cylindrical portion of the wheel hub.

4. The vehicle wheel bearing apparatus of claim 3 wherein an outer circumferential region of the wheel mounting flange from an inboard base side to the axially extending cylindrical portion is hardened by high frequency induction hardening to have a surface hardness of about 58~64 HRC, and the caulked portion remains unhardened to have a surface hardness of 25 HRC or less after forging.

5. A semi-floating vehicle wheel bearing apparatus comprising an axle housing supported under a body of a vehicle; a drive shaft inserted into the axle housing; and the vehicle wheel bearing apparatus of claim 1 arranged between the drive shaft and an opening of the axle housing; and the drive shaft is connected to said inner member so that torque is transmittable between the two.

6. The semi-floating vehicle wheel bearing apparatus of claim 5 wherein the drive shaft is separably connected to the inner member via the serration.

7. The semi-floating vehicle wheel bearing apparatus of claim 1 wherein a partition wall is located on an axis of the wheel hub in a direction toward an inner side end of the mounting flange.

* * * * *